United States Patent
Karadkar et al.

(10) Patent No.: US 11,718,780 B2
(45) Date of Patent: Aug. 8, 2023

(54) FOAMED SCALE REMOVAL AND INHIBITION METHOD FOR SUBTERRANEAN FORMATION

(71) Applicant: SAUDI ARABIAN OIL COMPANY, Dhahran (SA)

(72) Inventors: Prasad Baburao Karadkar, Dhahran (SA); Bader G. Harbi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/644,370

(22) Filed: Dec. 15, 2021

(65) Prior Publication Data
US 2023/0183552 A1    Jun. 15, 2023

(51) Int. Cl.
| | |
|---|---|
| E21B 43/27 | (2006.01) |
| C09K 8/528 | (2006.01) |
| C09K 8/536 | (2006.01) |
| C09K 8/74 | (2006.01) |
| E21B 37/06 | (2006.01) |
| C09K 8/70 | (2006.01) |
| C09K 8/60 | (2006.01) |

(52) U.S. Cl.
CPC .............. *C09K 8/528* (2013.01); *C09K 8/536* (2013.01); *C09K 8/604* (2013.01); *C09K 8/703* (2013.01); *C09K 8/74* (2013.01); *E21B 37/06* (2013.01); *E21B 43/27* (2020.05)

(58) Field of Classification Search
CPC ........ C09K 8/528; C09K 8/536; C09K 8/604; C09K 8/703; C09K 8/74; E21B 43/27; E21B 37/03
See application file for complete search history.

(56) References Cited

U.S. PATENT DOCUMENTS

| | | | |
|---|---|---|---|
| 8,138,127 B2 | 3/2012 | Pope et al. | |
| 2005/0250666 A1 | 11/2005 | Gatlin et al. | |
| 2010/0044050 A1 | 2/2010 | Savu et al. | |
| 2013/0264061 A1 | 10/2013 | Baran, Jr. et al. | |
| 2015/0096751 A1* | 4/2015 | Shen | C09K 8/92 507/224 |
| 2019/0233715 A1* | 8/2019 | Alexis | C09K 8/602 |
| 2021/0002444 A1* | 1/2021 | Dwarakanath | C09K 8/602 |
| 2021/0002544 A1* | 1/2021 | Hahn | E21B 43/162 |

FOREIGN PATENT DOCUMENTS

CA    2446628 C    11/2002

OTHER PUBLICATIONS

"3M Well Stimulant WS-1200", Technical Data Sheet, 3M Advanced Materials Division, 3M ID 98-0212-4218-9, issued 2016 (2 pages).

\* cited by examiner

*Primary Examiner* — Silvana C Runyan
(74) *Attorney, Agent, or Firm* — Osha Bergman Watanabe & Burton LLP (57) ABSTRACT

A composition includes a nonionic fluorinated polymeric surfactant, a nonfluorinated surfactant, and a scale treatment. Additionally, a method for scale treatment is provided. The method includes injecting gas into the aforementioned composition to produce a foam and injecting the foam into a formation. In the formation, the foam may be exposed to a first temperature at which it has a first viscosity. The foam may be maintained inside the formation for a period of time, and then recovered from the formation, at which point it is exposed to a second temperature and has a second viscosity.

6 Claims, 5 Drawing Sheets

FOAMED SCALE REMOVAL AND INHIBITION METHOD FOR SUBTERRANEAN FORMATION

BACKGROUND

Scale deposition is a primary challenge in oil and gas processes. Inorganic scale can develop in the formation pores near the wellbore, reducing formation porosity and permeability. It can prevent fluid flow by forming a thick lining in production tubing and coating downhole completion equipment. Scale may be caused by precipitation from saturated water due to changes in temperature and pressure, chemical reactions, or a change in fluid composition. The most common scales that impede oilfield processes include carbonates, sulfates, silicates, phosphates, and oxides.

Various scale removal and inhibition methods exist. Mechanical and chemical methods may be used for scale removal, whereas inhibition can be achieved by continuous injection or periodic squeeze treatments of scale-inhibitor chemicals. Often, scale dissolvers can be diverted away from the target treatment area into high-permeability zones in the formation, taking the path of least resistance. Likewise, bullheading scale inhibitors into a formation can lead to overtreatment of low-pressure and high-permeability zones and undertreatment of high-pressure and low-permeability zones. Foamed scale treatments have various advantages over their non-foamed counterparts; the low liquid volume of foams results in less fluid loss in highly permeable formations. Foams also have a greater ability to suspend and transport particulate matter, thus enhancing scale removal. Nevertheless, there are few established foamed scale treatment methods for subterranean applications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition including a nonionic fluorinated polymeric surfactant, a nonfluorinated surfactant, and a scale treatment selected from the group consisting of a scale dissolver, a scale inhibitor, and a combination thereof.

In another aspect, embodiments disclosed herein relate to a method for scale treatment including injecting gas into a composition to produce a foam, wherein the composition is as described above, and injecting the foam into a formation. In the formation, the foam may be exposed to a first temperature at which it has a first viscosity. The foam may be maintained inside the formation for a period of time, and then recovered from the formation. During recovery, the foam may be exposed to a second temperature at which it has a second viscosity.

Other aspects and advantages of the claimed subject matter will be apparent from the following description and the appended claims.

DETAILED DESCRIPTION

Embodiments disclosed herein generally relate to compositions and methods for removing and inhibiting scale deposition in subterranean formations using an energized foamed fluid system. The foamed fluid system may comprise a nonionic fluorinated polymeric surfactant, a nonfluorinated surfactant, an aqueous phase, a gas phase, a scale treatment, and optionally, a stimulation fluid. One or more embodiments relate to a foamed fluid composition that exhibits thermally reversible viscosity. Methods in accordance with some embodiments may involve injecting the foamed fluid into a formation, exposing the fluid to increased temperature, thus resulting in the fluid having a decreased viscosity. Such methods may further involve flowback of the foamed fluid system, and exposing the foam to lower temperatures, resulting in the foamed fluid having an increased viscosity.

The foamed fluid in accordance with the present disclosure may be a low-viscosity aqueous solution under downhole conditions that increases in viscosity during flowback. Such a foamed fluid system may be used as a treatment fluid to penetrate reservoirs with efficient distribution of the fluid, particularly in the case of areas of high permeability and heterogeneous formations. Additionally, the high-viscosity foamed composition may exhibit a greater ability to suspend and transport particulate matter, such as scale, out of the wellbore during flowback.

Foamed Fluid Composition

In one aspect, embodiments of the present disclosure are related to treatment fluid compositions for scale deposition removal and inhibition. The treatment fluid may have thermally reversible viscosity, meaning the viscosity may be significantly altered upon a change in temperature. In one or more embodiments, the treatment fluid may be a foamed fluid system. In a foam, gas bubbles are dispersed throughout a liquid, generally water, and stabilized by a surfactant. Foamed fluid compositions in accordance with the present disclosure may comprise a nonionic fluorinated polymeric surfactant, a nonfluorinated surfactant, an aqueous phase, a gas phase, and a scale inhibitor, a scale dissolver, or a mixture thereof. In some embodiments, stimulation fluids may also be included in the foamed fluid compositions.

According to one or more embodiments, the nonionic fluorinated polymeric surfactant may include alkylene oxide units having a structure represented by Formula I:

(I)

where n is 2 to 10.

The alkylene oxide monomer units may be present in an amount ranging from 0.1% to 10% by weight, based on the total weight of the nonionic fluorinated polymeric surfactant.

The nonionic fluorinated polymeric surfactant may also include perfluoroalkyl groups. In particular, the perfluoroalkyl groups may be present in units derived from a monomer having a structure as shown in by Formula II:

where R is a perfluoroalkyl group having from 1 to 8 carbons atoms.

The units derived from the monomer represented by Formula (II) may be present in an amount ranging from 0.1% to 10% by weight, based on the total weight of the nonionic fluorinated polymeric surfactant.

In one or more particular embodiments, the nonionic fluorinated polymeric surfactant may be WS-1200®, a commercially available foaming agent supplied by 3M™. As will be appreciated by those skilled in the art, similar nonionic fluorinated polymeric surfactants may be used in the disclosed composition.

The nonionic fluorinated polymeric surfactant may be present in the foam composition in an amount ranging from 0.5 to 5% v/v (volume per volume) based on the total volume of the foamed fluid composition. The foaming agent may be included in an amount having a lower limit of one of 0.5, 0.6, 0.7, 0.8. 1.0 and 1.2, and 1.5% v/v and an upper limit of one of 2.0, 2.5, 3.0, 3.5, 4.0, 4.5, and 5.0% v/v where any lower limit may be paired with any mathematically compatible upper limit.

Foamed fluid compositions in accordance with the present disclosure may also include a non-fluorinated surfactant. In one or more embodiments, the non-fluorinated surfactant may be a-olefin sulfonate, alkyl toluene sulfonate, alcohol ethoxylate, alcohol ethoxysulfate, alcohol ethoxyethylsulfonate, alcohol ethoxyglyceryl sulfonate, cetrimonium bromide, sodium dodecyl sulfate, and combinations thereof.

The foamed fluid composition of one or more embodiments may also include a scale dissolver. The scale dissolver may be a chelating agent. In embodiments in which a chelating agent is used as a scale dissolver, the chelating agent may be ethylenediaminetetraacetic acid (EDTA), diethylenetriaminepentaacetic acid (DTPA), N-(2-hydroxyethyl)ethylenediamine-N,N,N-triacetic acid (HEDTA), N,N-dicarboxymethyl glutamic acid tetrasodium salt (GLDA), methanesulfonic acid (MSA), and other chelating agents known in the art. In one or more embodiments, the scale dissolver may be a mineral acid such as hydrochloric acid (HC1), sulfuric acid, or nitric acid. The scale dissolver may also be an organic acid such as acetic acid, formic acid, citric acid, or lactic acid. The scale dissolvers disclosed herein may be used alone or in combination.

In one or more embodiments, the scale dissolver is included in the foamed fluid composition in an amount ranging from 0.5% to 20% based on the liquid phase volume of the foam composition. The scale dissolver may be included in an amount having a lower limit of one of 0.5, 0.8, 1.0, 1.5, 2.0, 2.5, 3.0, 4.0, 5.0, 6.0, 7.0, and 8.0% and an upper limit of one of 9.0, 10, 11, 12, 13, 14, 15, 16, 17, 18, 19, and 20% where any lower limit may be paired with any mathematically compatible upper limit.

Foamed fluid compositions in accordance with the present disclosure may also include a scale inhibitor. Scale inhibitors may be from the general category of phosphonates, phosphate esters, and polymeric scale inhibitors. Examples of suitable scale inhibitors include, but are not limited to, 1-hydroxyethylidene-1,1-diphosphonic acid (HEDP), aminotrimethylenephosphonic acid (ATMP), diethylenetriamine penta (DTPMP), triethanolamine phosphate ester, hydroxyamino phosphate ester, polyphosphinocarboxylic acid (PPCA), polyacrylic acid, polymaleic acid, copolymers of acrylic acid and maleic acid, and combinations thereof.

In one or more embodiments, the scale inhibitor is included in the foamed fluid composition in an amount ranging from 0.5% to 20%. The scale inhibitor may be included in an amount having a lower limit of one of 0.5, 0.8, 1.0, 1.5, 2.0, 2.5, 3.0, 4.0, 5.0, 6.0, 7.0, and 8.0% and an upper limit of one of 9.0, 10, 11, 12, 13, 14, 15, 16, 17, 18, 19, and 20% where any lower limit may be paired with any mathematically compatible upper limit.

Foamed fluid compositions of one or more embodiments may include a mixture of a scale dissolver and a scale inhibitor. The mixture of scale treatments may be present in an amount ranging from 0.5% to 20%. For example, the mixture of scale treatments may be included in an amount having a lower limit of one of 0.5, 0.8, 1.0, 1.5, 2.0, 2.5, 3.0, 4.0, 5.0, 6.0, 7.0, and 8.0% and an upper limit of one of 9.0, 10, 11, 12, 13, 14, 15, 16, 17, 18, 19, and 20% where any lower limit may be paired with any mathematically compatible upper limit. In embodiments in which scale treatment are mixed, the mixture may include a ratio of scale dissolver to scale inhibitor ranging from 20:80 to 80:20. The mixture of scale treatments may have a ratio of any of 20:80, 30:70, 40:60, 50:50, 60:40, 70:30, and 80:20 of scale dissolver: scale inhibitor.

In one or more embodiments, foamed fluid compositions include an aqueous phase. The water of the aqueous phase may be any form of water, including, but not limited to, deionized water; filtered or raw fresh waters; mineral waters; filtered, raw or synthetic seawater; brackish water; synthetic or natural brines; salt water; formation water; pond water, and produced water. The water may contain an amount of organics from natural or artificial sources as long as the function of the composition, which is to dissolve and inhibit scale deposition, is not inhibited. The water may contain an amount of minerals or metals from natural or artificial sources as long as the function of the composition is not inhibited.

In accordance with one or more embodiments, foamed fluid compositions may include a gas phase. Introducing gas bubbles into a composition comprising an aqueous-based liquid phase, a nonionic fluorinated polymeric surfactant, and a scale treatment in accordance with the present disclosure may be carried out by injecting highly compressed and cooled gas such that it is in the form of liquid into the composition. In other embodiments, a gas may be introduced into the composition in gaseous form. Gases that may be injected into the foam composition include, but are not limited to nitrogen, carbon dioxide, natural gas, hydrogen, and helium. In one or more embodiments, foam compositions may include gas bubbles at volume fractions ranging from 20% to 80% of the total foam volume. For example, foamed fluid compositions may include gas bubbles in a volume having a lower limit of one of 20, 25, 30, 35, 40, 45, and 50% and an upper limit of any of 40, 45, 50, 55, 60, 65, 70, 75, and 80%, where any lower limit may be paired with any mathematically compatible upper limit.

Foamed fluid compositions of the present disclosure may further include stimulation fluids such as fracturing fluids and acidizing fluids. Examples of stimulation fluids that may be added to the disclosed foamed fluid compositions include, but are not limited to, fracturing fluids that include gaur, gaur derivatives, and polyacrylamide, and acidizing fluids that include HC1, acetic acid, formic acid and combinations thereof. In embodiments in which the foamed fluid composition includes a stimulation fluid, the stimulation fluid may be present in a range of from about 30% to 70% by volume. The stimulation fluid may be included in an amount having a lower limit of one of 30, 35, 40, 45, 50, and 55% by volume and an upper limit of one of 45, 50, 55, 60, 65, and 70% by volume, where any lower limit may be paired with any mathematically compatible upper limit.

Foam Properties

Foam compositions described herein may have properties that are advantageous for use in downhole applications. The stability and other characteristics of foams in accordance with the present disclosure may be measured according to techniques known in the art.

Unless indicated otherwise, the foam half-life is determined by a blender test. Generally, a blender test may be performed by mixing nonionic fluorinated polymeric surfactant with water in a blender at a shear rate of 500 to 1000 s$^{-1}$ for one minute at 25° C. The foam is then transferred to a graduated cylinder, and the time it takes to reduce the volume of the foam to half of the initial volume is measured. The time is referred to as the foam half-life. In some embodiments, the half-life of the foam may range from about 5 to 20 minutes at room temperature (25° C.). For example, the foam may have a half-life with a range having a lower limit of any of 5, 6, 7, 8, 9, 10, and 11 minutes and an upper limit of any of 12, 13, 14, 15, 16, 17, 18, 19, and 20 minutes, where any lower limit may be used in combination with any mathematically compatible upper limit.

Foam quality is an important factor in determining foam stability and viscosity. Foam quality (F) is the ratio of gas volume to gas/liquid volume over a given temperature and pressure, and may be determined using Equation (I) below:

$$\Gamma = \frac{100 V_g}{V_g + V_l} \quad (1) \qquad (I)$$

where $V_g$ is the gas volume and $V_l$ is the liquid volume.

In foams that have a foam quality below about 50%, gas bubbles do not generally come in contact with each other. These foams have low foam viscosity and include a large volume of free liquid. Foam qualities ranging from 50% to 96% indicate a foam in which gas bubbles are in contact with each other, resulting in an increased foam viscosity. In one or more embodiments, foams may have a foam quality ranging from 50% to 80%. For example, the foam quality of disclosed foams may have a value range having a lower limit of one of 50, 52, 55, 58, 60, 62 and 65% and an upper limit of one of 67, 70, 72, 75, 77, and 80%, where any lower limit may be paired with any mathematically compatible upper limit.

Foam viscosity is a key parameter for use in the methods disclosed herein. Foam viscosity may be determined as follows. A mixture of liquid and gas is circulated through a helical coiled loop in a foam rheometer and the differential pressure across the coil is used to measure foam viscosity. As measured by a foam rheometer, foamed fluid compositions of the present disclosure may exhibit stabilized viscosity at room temperature ranging from about 30 to about 75 cP (centipoise) at 300 s$^{-1}$ shear rate. Embodiment foams may have a viscosity with a lower limit of any of 30, 33, 35, 37, 40, 43, 45, 47, and 50 cP and an upper limit of any of 53, 55, 57, 60, 64, 65, 67, 70, 73 and 75 cP, where any lower limit may be used in combination with any mathematically compatible upper limit.

Foam compositions in accordance with the present disclosure exhibit reversible viscosity. Reversible viscosity is defined herein as viscosity that may change with the change of an external condition, such as temperature, and subsequently return to the initial viscosity upon return to initial external conditions. Foams herein may demonstrate such reversible viscosity as a function of temperature. At temperatures ranging from 80 to 120° F., embodiment foams may have a viscosity of about 30 to about 75 cp. For example, foams may have a viscosity with a lower limit of any of 30, 33, 35, 37, 40, 43, 45, 47, and 50 cP and an upper limit of any of 53, 55, 57, 60, 64, 65, 67, 70, 73 and 75 cP, where any lower limit may be used in combination with any mathematically compatible upper limit.

Upon increasing the temperature of the foam to a range of about 130 to 200° F., the foam may exhibit a decrease in viscosity to below 10 cP. That is, at temperatures above 130° F., embodiment foams may have a viscosity with a lower limit of any of 0.5, 1.0, 1.5, 2.0, 2.5, 3.0, 3.5, 4.0, and 4.5 cP and an upper limit of any of 5.0, 5.5, 6.0, 6.5, 7.0, 7.5, 8.0, 8.5, 9.0, 9.5, and 10 cP, where any lower limit may be used in combination with any mathematically compatible upper limit. As used herein, this viscosity below 10 cP may also be referred to as "water-like viscosity."

In one or more embodiments, after subjecting a foam to elevated temperatures (above 130° F.), the temperature of the foam may be decreased to a range of 80 to 120° F. such that the foam viscosity is restored to a range of about 30 to about 75 cP. In one or more embodiments, multiple cycles of the heating and cooling method described above may be carried out on a foam. For example, disclosed foams may be subjected to elevated temperatures of 140-200° F., then cooled to 80-120° F., heated back up to 140-200° F., and finally cooled back down to 80-120° F. In such an embodiment, the final foam may exhibit a viscosity of at least 70% of the original foamed viscosity of about 30 to 75 cP. The viscosity of the final foam may be any of 70, 75, 80, 85, 90, 95, and 100% of the original foamed viscosity.

Method for Scale Removal and Inhibition

Figure 1:
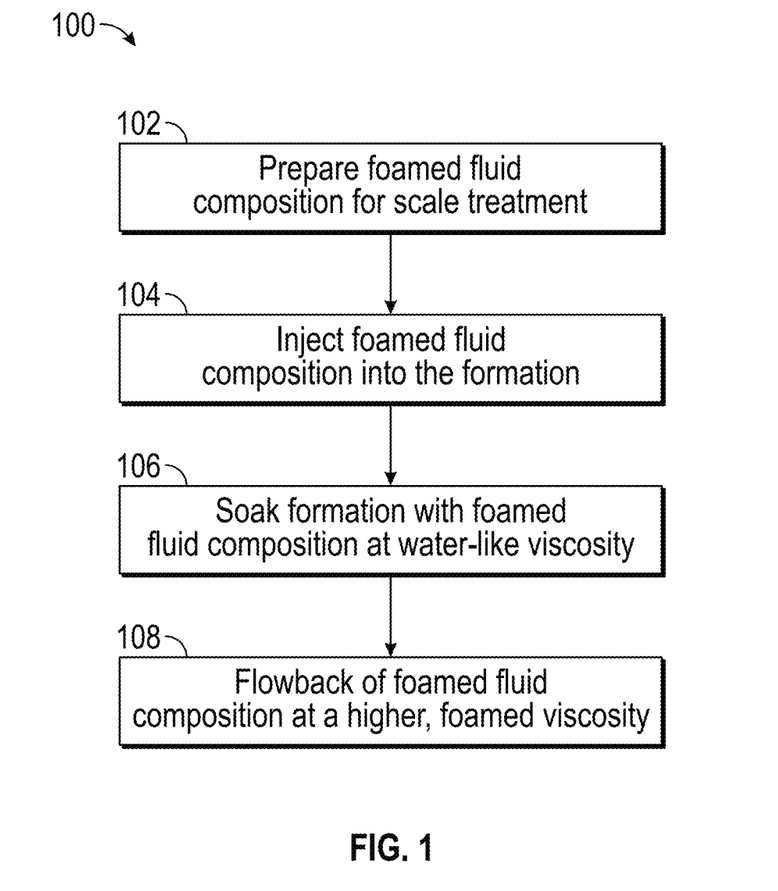
FIG. 1 is a block flow diagram of an embodiment method of formation scale treatment.

In another aspect, embodiments herein relate to the application of the presently disclosed foam compositions to wellbore scale removal and inhibition. FIG. 1 shows an embodiment method 100 for scale removal and inhibition that includes preparing a foam composition as previously described 102.

Then, the method includes injecting a foamed fluid as described above into a formation at a high temperature 104. The foamed fluid may be pre-foamed at the surface prior to injection or injected as a composition having low foam quality. Individual components of the foamed fluid composition as described above may be mixed together at the surface or added sequentially downhole. At elevated downhole temperatures, the foamed fluid has a water-like viscosity. Foamed fluid compositions having a water-like viscosity downhole facilitate penetration deep into the formation.

In some embodiments, the step of injecting the foamed fluid 102 may include a squeeze treatment. A squeeze treatment is a controlled application of pump pressure to force a treatment fluid or slurry into a planned treatment zone. Squeezes are often used in scale removal and inhibition methods, and thus are well-known injection methods to those skilled in the art.

Once injected, the formation is soaked for a period of time ranging from 24 to 48 hours 106 (soaking time). In this soaking step, the foam is maintained inside the formation for the soaking time. A sufficient soaking time is necessary to effectively remove scale from the formation. As a result of the soaking step scale buildup may be removed from the formation.

After soaking the formation for a period of time with the foamed fluid, methods may further include a flowback step 108 in which the foam is recovered from the formation. During flowback, the treatment fluid is exposed to decreased temperatures, resulting in foaming. Foaming may occur gradually, as the ambient downhole temperature decreases. The foam is then recovered as fluid is produced from the formation. Foamed treatment fluids have a greater ability to suspend particulate matter than liquid treatments, and thus may result in more effective scale removal and wellbore cleanup.

The disclosed methods may be used for scale removal, scale inhibition, and combinations of scale removal and scale inhibition.

Figure 2:
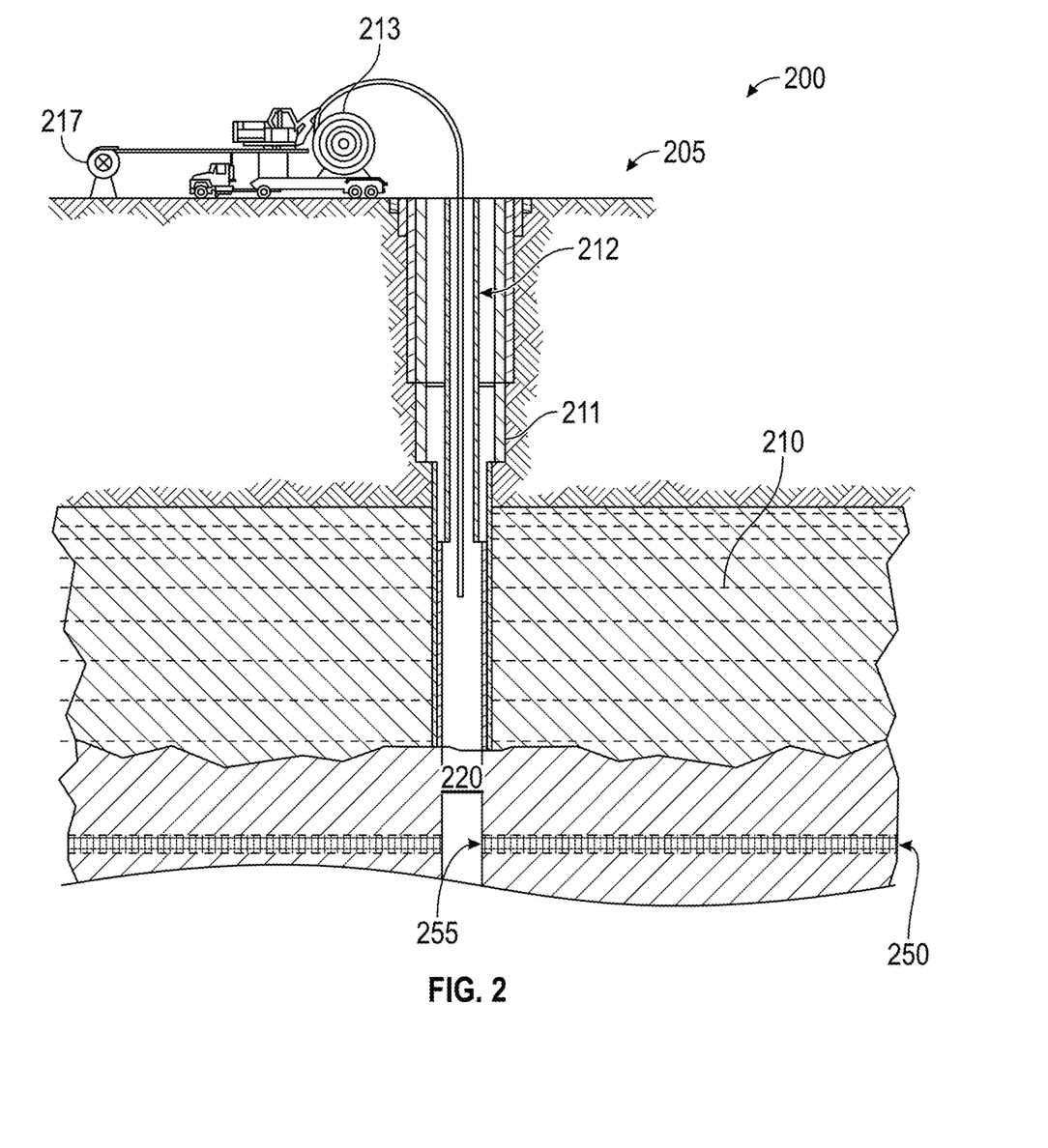
FIG. 2 is a simplified schematic of an embodiment hydrocarbon bearing formation.

FIG. 2 is a diagram that illustrates a well environment 200 in accordance with one or more embodiments. Well environment 200 includes a subsurface 210. Subsurface 210 is depicted having a wellbore wall 211 both extending downhole from a surface 205 into the subsurface 210 and defining a wellbore 220. The subsurface also includes target formation 250 to be treated. Target formation 250 has target formation face 255 that fluidly couples target formation 250 with wellbore 220 through wellbore wall 211. In this case, casing 212 and coiled tubing 213 extend downhole through the wellbore 220 into the subsurface 210 and towards target formation 250.

With the configuration in FIG. 2, the previously described embodiment foamed fluid that comprises a scale inhibitor, a scale dissolver, or a combination thereof may be introduced into the subsurface 210 and towards target formation 250 via a pump 217 through the coiled tubing 213. In another embodiment, as previously described, the foamed fluid may be formed in situ, meaning components of the foamed fluid (nonionic fluorinated surfactant, non-fluorinated surfactant, aqueous phase, gas phase, scale treatment) may be introduced into the subsurface 210 separately via the pump 217 through the coiled tubing 213, forming the foamed fluid inside the target formation 250. In such embodiments, multiple pumps may be used to separately inject components of the dispersion.

Embodiments of the present disclosure may provide at least one of the following advantages. Foam compositions that exhibit thermally reversible viscosity may be used to treat scale depositions that are deep in the formation. Compositions of the present disclosure will be injected into the wellbore as a foam. As the foam travels downhole, and the temperature increases, the foam viscosity will decrease until it reaches water-like viscosity. This alone will allow for better scale removal and inhibition of deeper formations. Additionally, during flowback, compositions disclosed herein will provide a viscous foam due to the reduction in temperature, increasing the amount of particulate that is suspended and carried out of the wellbore.

Examples

The foam half-life was determined by a blender test. In a Warring blender, 0.5% v/v of WS-1200 was mixed with 100 mL water at a shear rate of 500-1000 $s^{-1}$ for one minute at 25° C. The foam was then transferred to a 500 mL graduated cylinder, and the time it took to reduce the volume of the foam to half of the initial volume was measured. The time was recorded as the foam half-life. The half-life of the foam was 10 minutes at room temperature (25° C.).

Foam viscosity may be determined using a foam rheometer as follows. Foam compositions were generated in the rheometer by subjecting a solution of 1% v/v WS-100 in 300 mL DI (deionized) water to nitrogen ($N_2$) gas. The requisite amount of $N_2$ gas was added to reach the desired foam quality. After reaching 54% foam quality and a stabilized viscosity at 300 $s^{-1}$ shear rate, temperature dependency studies were performed on the foam.

Figure 3:
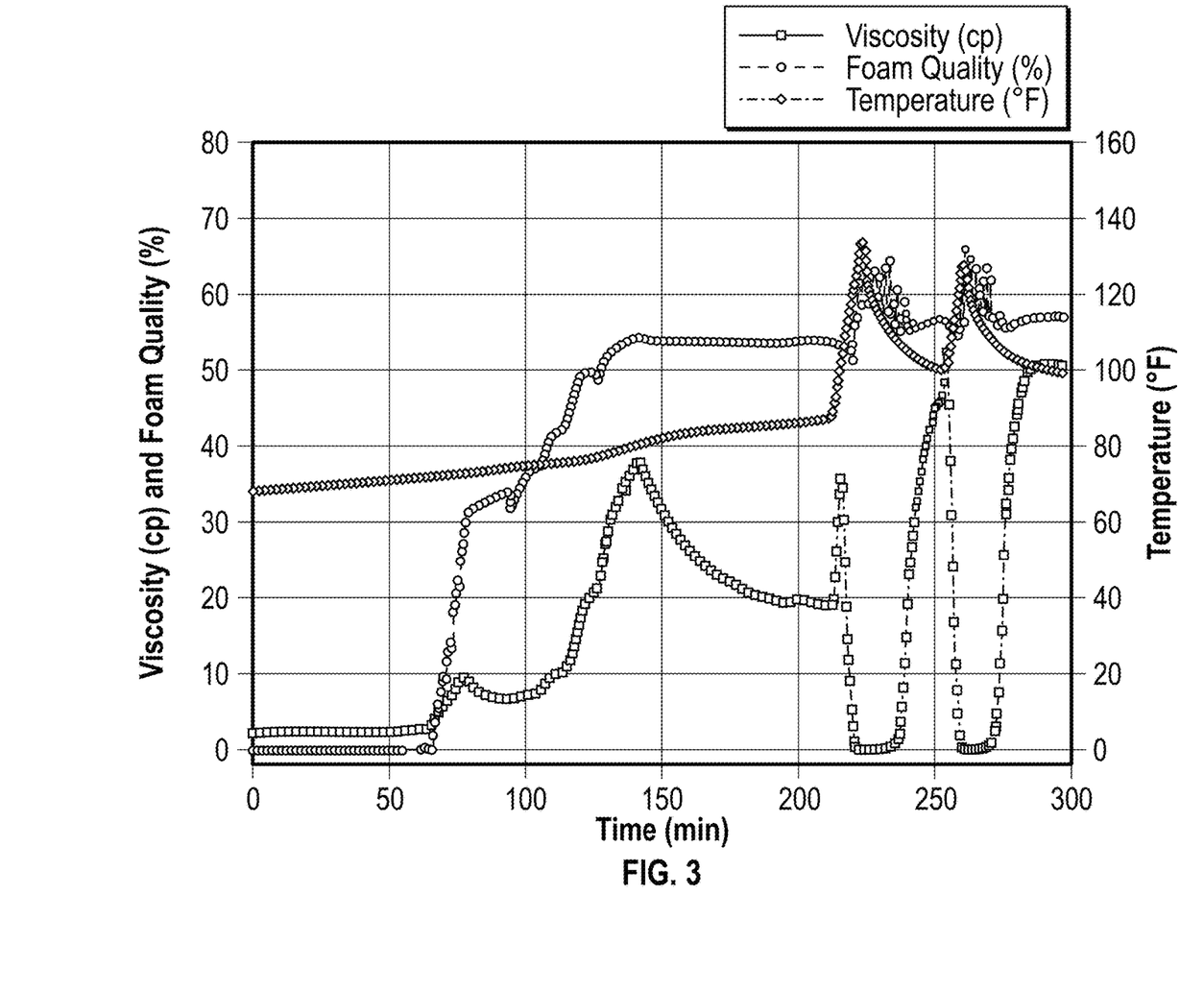
FIG. 3 is a graph showing the viscosity of a foamed fluid composition in accordance with one or more embodiments.

A graph of the viscosity of the above foam composition with respect to temperature is shown in FIG. 3. At 100° F., the foam has a viscosity of 38 cP. Upon heating, the foam viscosity begins to decrease at 140° F., until it reaches water-like viscosity around 1-2 cP at 300 $s^{-1}$ shear. As the foam is cooled back down to 100° C., its viscosity is restored to at least 38 cP.

Figure 4A:
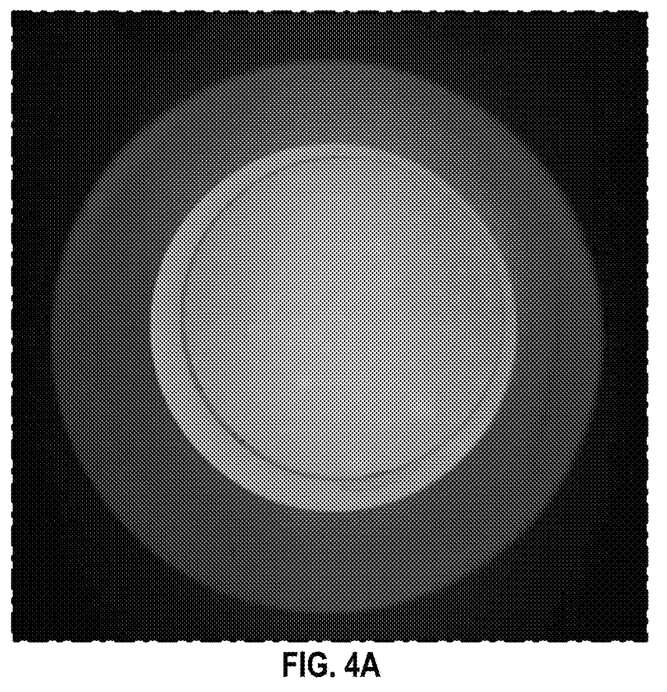
FIG. 4A is a picture of a foamed fluid composition in accordance with one or more embodiments at 100° F.
Figure 4B:
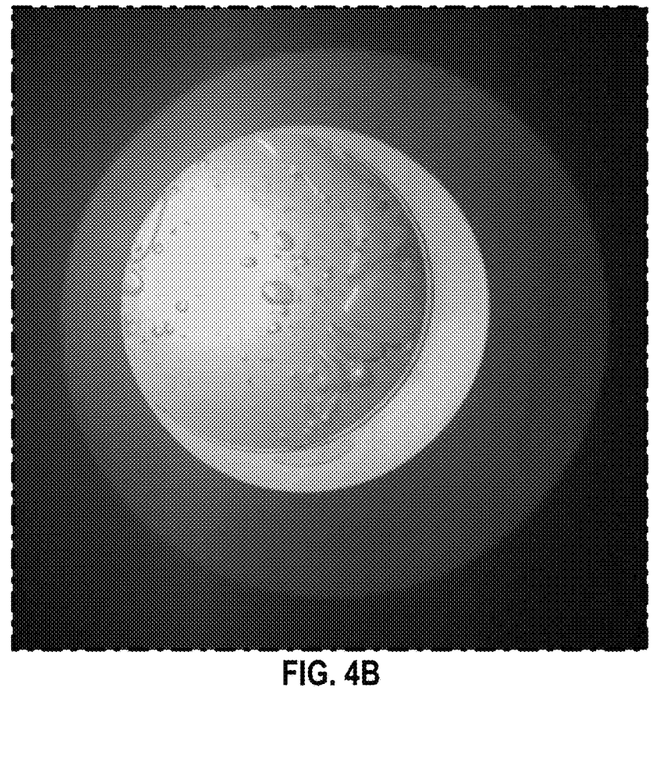
FIG. 4B is a picture of a foamed fluid composition in accordance with one of more embodiments at 130° F.

Throughout the temperature experiment described above, the foam composition physically changed. At 100° F., a uniform foam was observed (FIG. 4A), whereas at 140° F. and above, the foam was broken, as shown in FIG. 4B.

Figure 5:
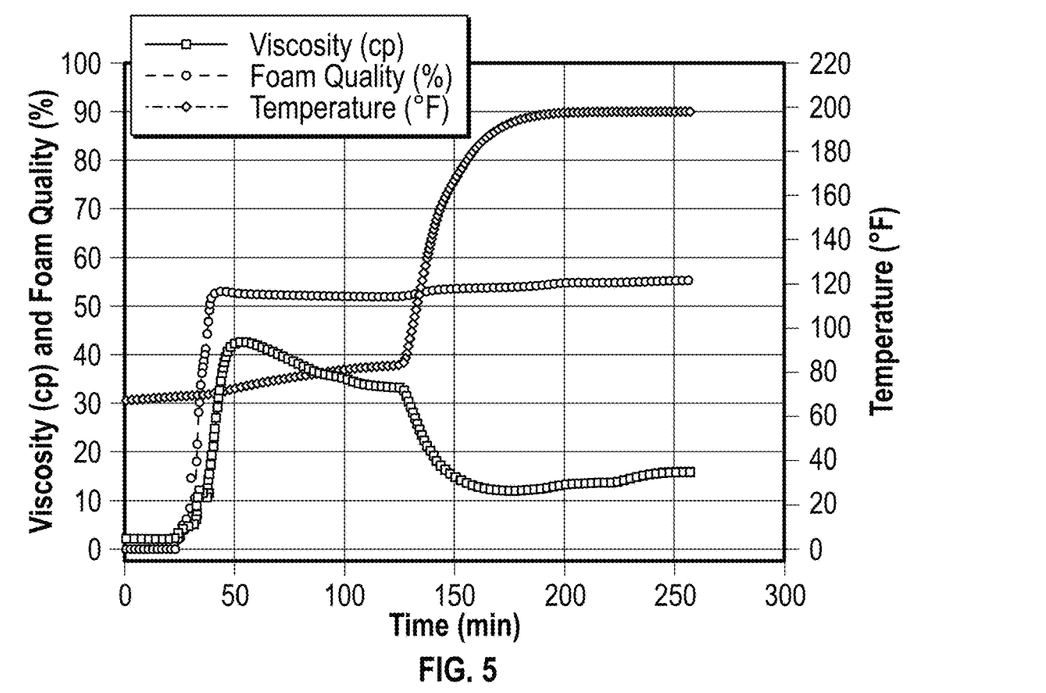
FIG. 5 is a comparative example of the viscosity of a foamed fluid composition in accordance with one of more embodiments.

As a comparative example, the same temperature dependency studies were performed using Marfoam CAB as a foaming agent. After reaching 53% foam quality and a stable viscosity of 33 cP at 300 1/s shear rate, the temperature was increased to 200° F. Foam viscosity of Marfoam CAB with respect to temperature is shown in FIG. 5. As the temperature is increased, the foam viscosity decreases slightly and stabilizes at 15 cP. A uniform foam is observed throughout the experiment.

Figure 6:
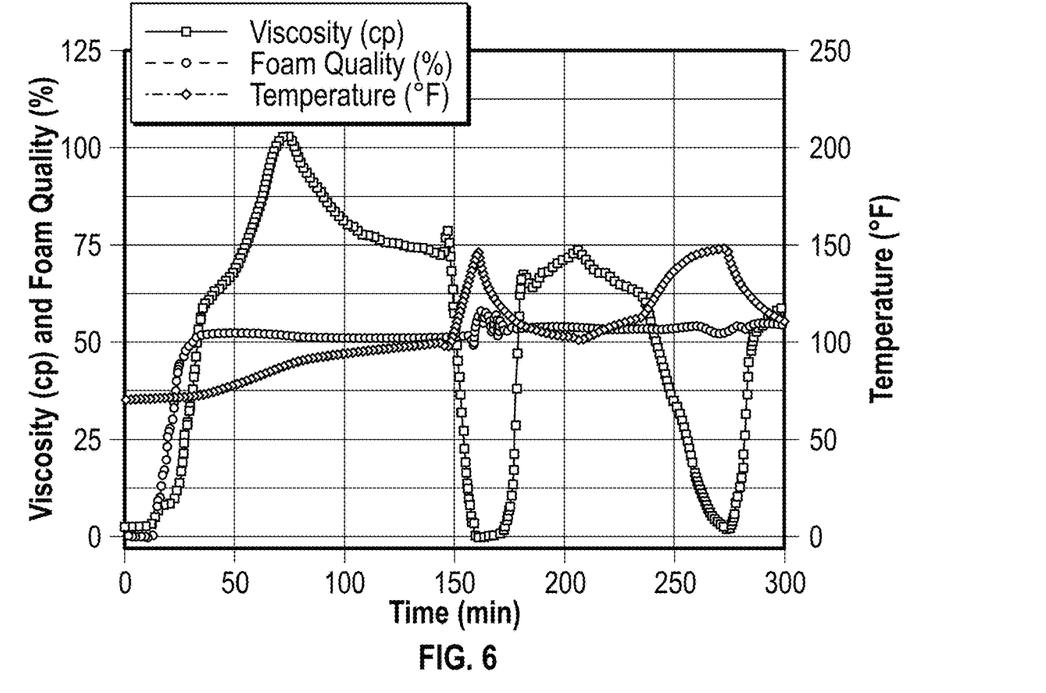
FIG. 6 is a graph showing the viscosity of a foamed fluid composition containing a scale dissolver in accordance with one or more embodiments.

A foam composition including a scale dissolver was also tested for reversible viscosity. A solution of 1% v/v WS-100 and 0.2 mol/L EDTA in 300 mL DI water was foamed with $N_2$ gas. After reaching 52% foam quality and a stable viscosity at 300 1/s shear rate, the temperature was increased. Foam viscosity of this composition with respect to temperature is shown in FIG. 6. Foam compositions including a scale dissolver exhibit similar reversible viscosity to foam compositions without a scale dissolver.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A composition comprising:
a nonionic fluorinated polymeric surfactant, comprising:
0.1% to 10% by weight based on a total weight of the nonionic fluorinated polymeric surfactant of one or more alkylene oxide monomer units represented by formula I:

(I)

wherein n is 2 to 10;
0.1% to 10% by weight based on the total weight of the nonionic fluorinated polymeric surfactant of units derived from a monomer having a structure represented by formula II:

(II)

Wherein R is a perfluoroalkyl group having from 1 to 8 carbons atoms;
a nonfluorinated surfactant; and
a scale treatment selected from the group consisting of a scale dissolver.

2. The composition of claim 1 wherein the scale treatment is a scale dissolver selected from the group consisting of ethylenediaminetetraacetic acid (EDTA), diethylenetriaminepentaacetic acid (DTPA), N-(2-hydroxyethyl)ethylenediamine-N,N,N-triacetic acid (HEDTA), N,N-dicarboxymethyl glutamic acid tetrasodium salt (GLDA), methanesulfonic acid (MSA), and combinations thereof.

3. The composition of claim 1, wherein the scale treatment is an acid scale dissolver selected from the group consisting of hydrochloric acid, sulfuric acid, nitric acid, acetic acid, formic acid, citric acid, lactic acid, and combinations thereof.

4. The composition of claim 1, wherein the nonfluorinated surfactant is selected from a group consisting of alpha olefin sulfonate, alkyl tolyl sulfonate, fluorocarbon, hydrocarbon-based surfactants, alcohol ethoxyglyceryl, sulfonate, fluoroalkyl sulfobetaine, alcohol ethoxylates, alcohol ethoxysulfates, alcohol ethoxyethylsulfonates, alcohol ethoxyglyceryl-sulfonates, cetrimonium bromide, sodium dodecyl sulfate, and combinations thereof.

5. The composition of claim 1, further comprising a stimulation fluid, wherein the stimulation fluid is a fracturing fluid or an acidizing fluid.

6. The composition of claim 1, wherein the gas is selected from the group consisting of nitrogen, carbon dioxide, hydrogen, helium, natural gas, and combinations thereof.

* * * * *